United States Patent Office 2,827,387
Patented Mar. 18, 1958

2,827,387
STABILIZED PARAFFIN WAX

Charles F. Duchacek, Long Island City, N. Y., assignor to Socony Mobil Oil Company, Inc., a corporation of New York No Drawing. Application February 25, 1953
Serial No. 338,895

2 Claims. (Cl. 106—270)

This invention is directed to the stabilization of petroleum waxes, such as paraffin wax, against the deteriorating effects of oxidation particularly as indicated by the development of odor.

Since most of the paraffin wax of commerce is concerned in uses where it is in contact with or may come in contact with foods or food products, the stabilization of the wax against deterioration of odor is of considerable economic importance.

It has been known that silicones are possessed of some inhibitive effect on the deterioration of wax. However, the action is not particularly marked, and is only comparable with other inhibitive substances such as t-butyl hydroxyanisole.

This invention is based upon the discovery that if the silicone be combined with a dispersant, the inhibitive effect of the silicone is greatly enhanced. It is believed that the explanation for this lies in the fact that straight silicones are not highly soluble in petroleum waxes and the inhibitive effect depends upon the amount actually taken up by the wax.

It has been found that surprising increases in inhibitive effect can be achieved by utilizing a proper dispersant. The dispersant of particular interest is a silica aerogel ground to the size of approximately 2 to 4 microns for better dispersability. Silica aerogels are a known commercial product, being manufactured usually in accordance with the procedure set forth in U. S. Patent 2,249,767, and are sold under the name "Santocel" by the Monsanto Chemical Company.

When a small amount of this material is incorporated in the silicone and this mixture is then added to the wax, a very considerably enhanced inhibitive effect is noted.

For example, using a conventional silicone oil of 40–80 centistokes viscosity at 100° F. to which there has been added 5 weight percent of silica aerogel ground to 2 to 4 microns; in parallel tests with uninhibited wax; wax inhibited with a commercial inhibitor (t-butyl hydroxyanisole, sold as "Sustane"); and wax inhibited with the commercial (about 200 centistokes at 100° F.) silicone known as Dow Corning 200 fluid; the following results were obtained.

TABLE 1
Effect of exposure to ultra-violet light in the Fade-O-Meter

| Material tested: | Hours of exposure, Wax still of good odor |
|---|---|
| 133/135 AMP paraffin wax | 2 |
| Same wax plus 0.0025 wt. percent Sustane | 4 |
| Same wax plus 0.02 wt. percent Dow Corning 200 F | 4 |
| Same wax plus 0.2 wt. percent of mixture of silicone plus 5% dispersant | 24 |

The wax used was a wax of commercial quality of the melting point indicated. The test machine is the commercially available Fade-O-Meter, utilized for exposure of various materials to intense ultra-violet light. The development of unsatisfactory odor in wax is a rather delicate test for the indication of deteriorative products of oxidation and similar reactions.

It will be noted that a six fold increase in stability of the wax was gotten with the silicone plus dispersant mixture.

The silica aerogel dispersant may be used in small amounts of from about 1% to about 10% by weight of the silicone oil. The molecular weight of the silicone polymer, as measured by its viscosity in centistokes at 100° F. does not appear to be greatly material as long as it is in the range of from 50 up to about 1000 centistokes. While the silica aerogel must be of sufficiently fine particle size for ready dispersion and the preferred particle size for the exemplary silicone used is about 2 to 4 microns, the criterion is dispersability in the silicone selected rather than any particular range of particle size.

The silicone plus dispersant may be used in the range of from 0.001 wt. percent to about 0.05 wt. percent, as necessary for stabilization.

I claim:

1. A paraffin wax product consisting of refined, colorless, odorless paraffin wax stabilized against oxidation by the addition thereto of from about 0.001 wt. percent to about 0.05 wt. percent of a mixture of a polyalkyl siloxane of 50–1000 centistokes viscosity at 100° F. and from 1.0 wt. percent to 10.0 wt. percent, based on the siloxane, of a finely divided silica aerogel dispersant.

2. A paraffin wax product consisting of refined, colorless, odorless paraffin wax stabilized against oxidation by the addition thereto of about 0.02 wt. percent of a mixture of a polyalkyl siloxane of 100 centistokes viscosity at 100° F. and about 5 wt. percent, based on the siloxane, of a finely divided silica aerogel.

References Cited in the file of this patent

UNITED STATES PATENTS

| 2,188,007 | Kistler | Jan. 23, 1940 |
| 2,383,521 | Sowa | Aug. 28, 1945 |
| 2,547,396 | Joanen | Apr. 3, 1951 |
| 2,550,438 | Foeller | Apr. 24, 1951 |
| 2,574,902 | Bechtold et al. | Nov. 13, 1951 |
| 2,626,870 | Cooke et al. | Jan. 27, 1953 |
| 2,643,964 | Smith | June 30, 1953 |
| 2,666,685 | Hommel et al. | Jan. 19, 1954 |

FOREIGN PATENTS

| 681,877 | Great Britain | Oct. 29, 1952 |